US012811291B2

(12) United States Patent
Lee

(10) Patent No.: US 12,811,291 B2
(45) Date of Patent: Nov. 24, 2026

(54) ANTENNA DEVICE AND DISPLAY DEVICE INCLUDING AN ANTENNA UNIT

(71) Applicant: LG Display Co., Ltd., Seoul (KR)

(72) Inventor: HyunKyu Lee, Paju-si (KR)

(73) Assignee: LG Display Co., Ltd., Seoul (KR)

(*) Notice: Subject to any disclaimer, the term of this patent is extended or adjusted under 35 U.S.C. 154(b) by 145 days.

(21) Appl. No.: 18/886,166

(22) Filed: Sep. 16, 2024

(65) Prior Publication Data

US 2025/0219288 A1 Jul. 3, 2025

(30) Foreign Application Priority Data

Dec. 28, 2023 (KR) ........................ 10-2023-0195163

(51) Int. Cl.
*H01Q 3/24* (2006.01)
*H01Q 1/50* (2006.01)

(52) U.S. Cl.
CPC ................. *H01Q 3/24* (2013.01); *H01Q 1/50* (2013.01)

(58) Field of Classification Search
CPC .................................. H01Q 3/24; H01Q 1/50
See application file for complete search history.

(56) References Cited

U.S. PATENT DOCUMENTS

2011/0175791 A1* 7/2011 Ozdemir .............. H01Q 21/245 343/876
2019/0165486 A1* 5/2019 Yoshida ............... H04B 7/0617

* cited by examiner

*Primary Examiner* — Graham P Smith
(74) *Attorney, Agent, or Firm* — Morgan, Lewis & Bockius LLP

(57) ABSTRACT

Embodiments of the disclosure relate to a display device and display panel including a reconfigurable antenna. The display device may include: a substrate including a display area configured to display an image and a non-display area not configured to display an image; a pixel unit including a plurality of pixels disposed in the display area; and an antenna unit disposed in at least a portion of the display area or at least a portion of the non-display area. The antenna unit may include a plurality of radiators and an antenna constituent circuit configuring an antenna with at least one of the plurality of radiators.

19 Claims, 17 Drawing Sheets

| Freq. 500 | L1+L2-W [mm] | L1 [mm] | L2 [mm] | W [mm] |
|---|---|---|---|---|
| 500 | 150 | 150 | 5 | 5 |
| 500 | 150 | 145 | 10 | 5 |
| 500 | 150 | 140 | 15 | 5 |
| 500 | 150 | 135 | 20 | 5 |
| 500 | 150 | 130 | 25 | 5 |
| 500 | 150 | 125 | 30 | 5 |
| 500 | 150 | 115 | 40 | 5 |
| 500 | 150 | 85 | 70 | 5 |

ANTENNA DEVICE AND DISPLAY DEVICE INCLUDING AN ANTENNA UNIT

CROSS-REFERENCE TO RELATED APPLICATION

This application claims priority from Korean Patent Application No. 10-2023-0195163, filed on Dec. 28, 2023, which is hereby incorporated by reference for all purposes as if fully set forth herein.

BACKGROUND

Field

Embodiments of the present disclosure relate to a reconfigurable antenna and a display device including the same.

Description of Related Art

The growth of the intelligent society leads to increased demand for various types of display devices. The display devices include, e.g., liquid crystal displays (LCDs), organic light emitting displays, or quantum dot light emitting displays (QLEDs).

These display devices may be employed in mobile devices, such as smartphones and tablet PCs, and antennas may be used in smartphones and tablet PCs to communicate with other devices.

Recently, as communication technology develops, such as the long term evolution-advanced (LTE-A) or the 5th generation communication (5G), the frequency bands of wireless signals transmitted/received are diversified. Antennas are required to have a unique length or shape depending on the frequency or wavelength of the transmitted/reception signals, making it increasingly difficult to implement conventional types of antennas due to advancements in communication technology.

Therefore, a need exists for a method for efficiently implementing an antenna of an electronic device, such as a display device, due to development of communication technology.

BRIEF SUMMARY

Accordingly, the present disclosure is directed to an antenna device and a display device including an antenna unit that substantially obviate one or more of the problems due to limitations and disadvantages of the related art.

In the foregoing background, embodiments of the present disclosure may provide an antenna device and a display device including an antenna unit, which may efficiently use a space of a display device by having an antenna unit in at least a portion of a display area or a non-display area of a display panel.

Embodiments of the present disclosure also aim to provide an antenna device and a display device including an antenna unit, which may change the resonance frequency and radiation property by controlling a connection between unit radiators.

Embodiments of the present disclosure also aim to provide an antenna device and a display device including an antenna unit, in which it is easy to change the connection structure between unit radiators for reconfiguring an antenna.

The objects of the present disclosure are not limited to the above-described objects, and other objects not mentioned can be clearly understood by those skilled in the art from the following description.

To achieve these objects and other advantages of the present disclosure, as embodied and broadly described herein, a display device according to an embodiment of the present disclosure may include a substrate including a display area configured to display an image and a non-display area not configured to display an image, a pixel unit including a plurality of pixels disposed in the display area DA, and an antenna unit disposed in at least a portion of the display area DA or at least a portion of the non-display area NDA. The antenna unit may include a plurality of radiators, and an antenna constituent circuit configuring an antenna with at least one of the plurality of unit radiators.

In another aspect of the present disclosure, an antenna device according to an embodiment of the present disclosure may include a substrate, a plurality of radiators disposed on the substrate, and an antenna constituent circuit configuring an antenna with at least one of the plurality of radiators. The antenna constituent circuit may be configured to control whether to connect the plurality of radiators and may include a plurality of switching elements disposed on the substrate. One of the plurality of switching elements may be connected between two adjacent radiators among the plurality of radiators.

According to embodiments of the present disclosure, it is possible to efficiently use a space of a display panel by having an antenna unit in at least a portion of a display area or a non-display area of the display panel.

According to embodiments of the present disclosure, it is possible to change the resonance frequency and radiation property by controlling a connection between unit radiators provided in a display panel.

According to embodiments of the present disclosure, it is possible to easily change the connection structure between radiators for reconfiguring an antenna, simplify the changing method, and save costs.

The advantages and effects according to the present disclosure are not limited to those described above, and additional advantages and effects are included in or may be obtained from the present disclosure.

Additional features and aspects of the disclosure will be set forth in the description that follows and in part will become apparent from the description or may be learned by practice of the inventive concepts provided herein. Other features and aspects of the inventive concepts may be realized and attained by the structure particularly pointed out in, or derivable from, the written description, claims hereof, and the appended drawings.

It is to be understood that both the foregoing general description and the following detailed description of the present disclosure are by way of example and are intended to provide further explanation of the disclosures as claimed.

BRIEF DESCRIPTION OF DRA WINGS

The accompanying drawings, which are included to provide a further understanding of the disclosure and are incorporated in and constitute a part of this application, illustrate example embodiments of the disclosure and together with the description serve to explain the principles of the disclosure. In the drawings.

Figure 3:
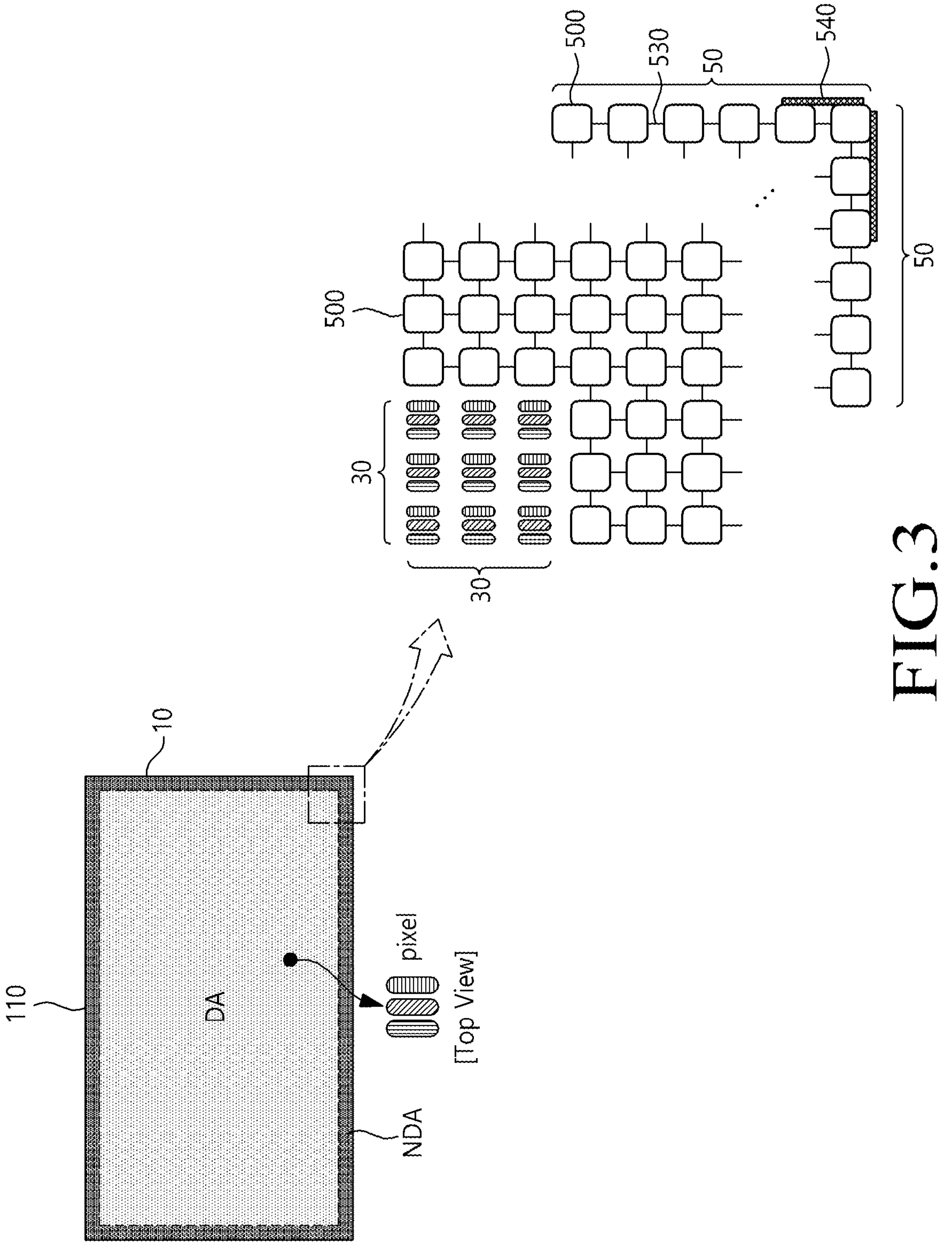
Figure 4A:
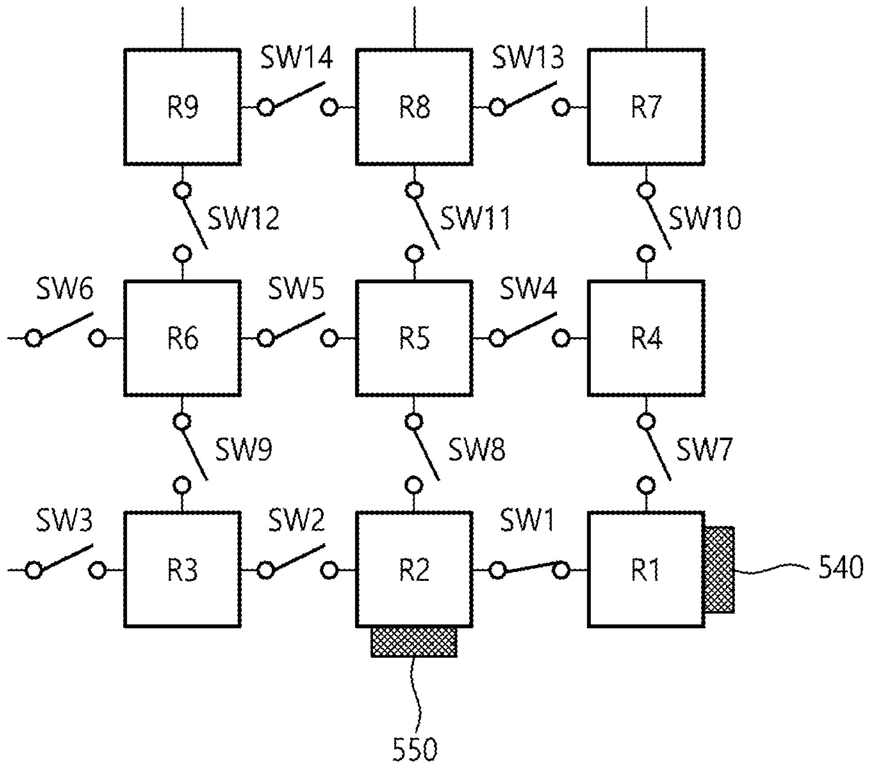
Figure 4B:
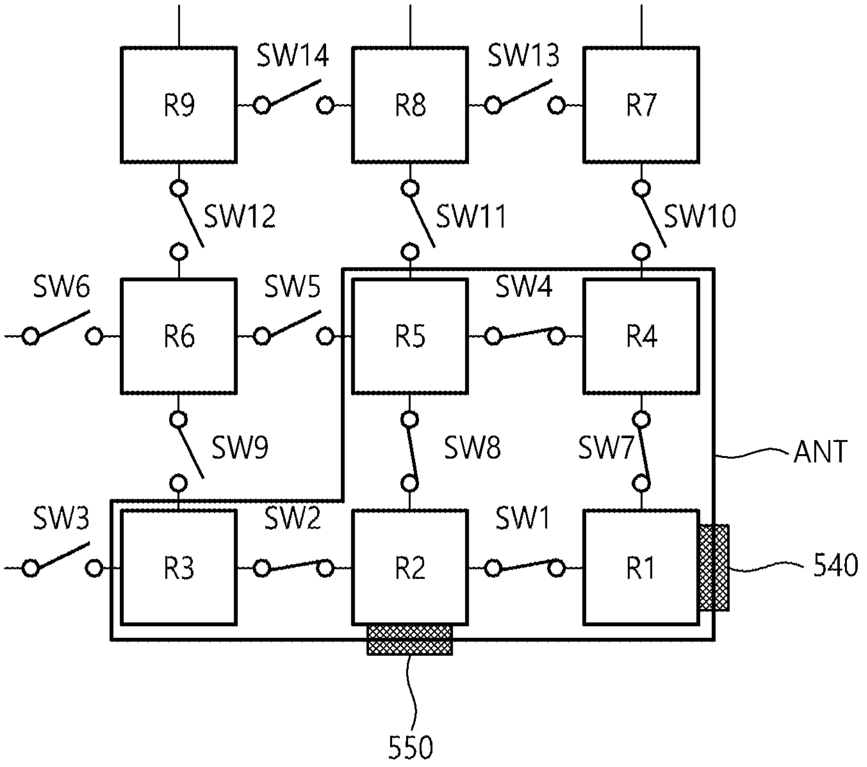
Figure 4C:
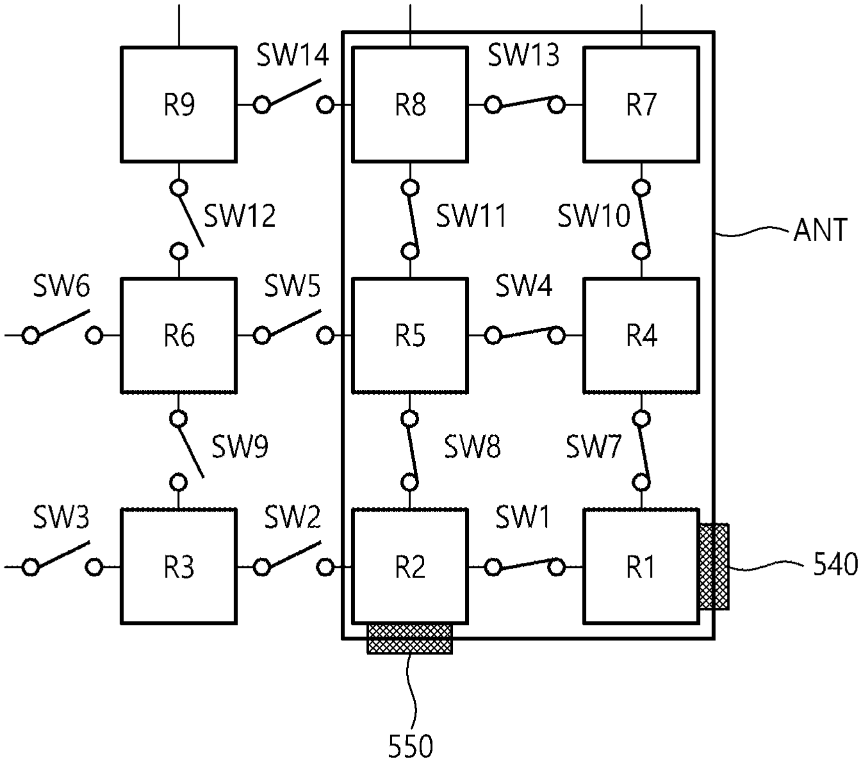
Figure 5:
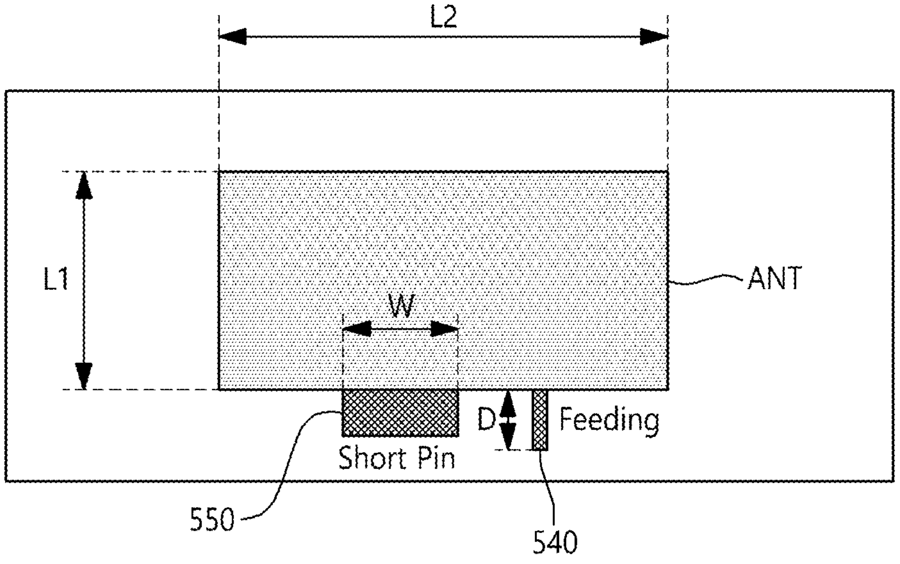
Figure 7:
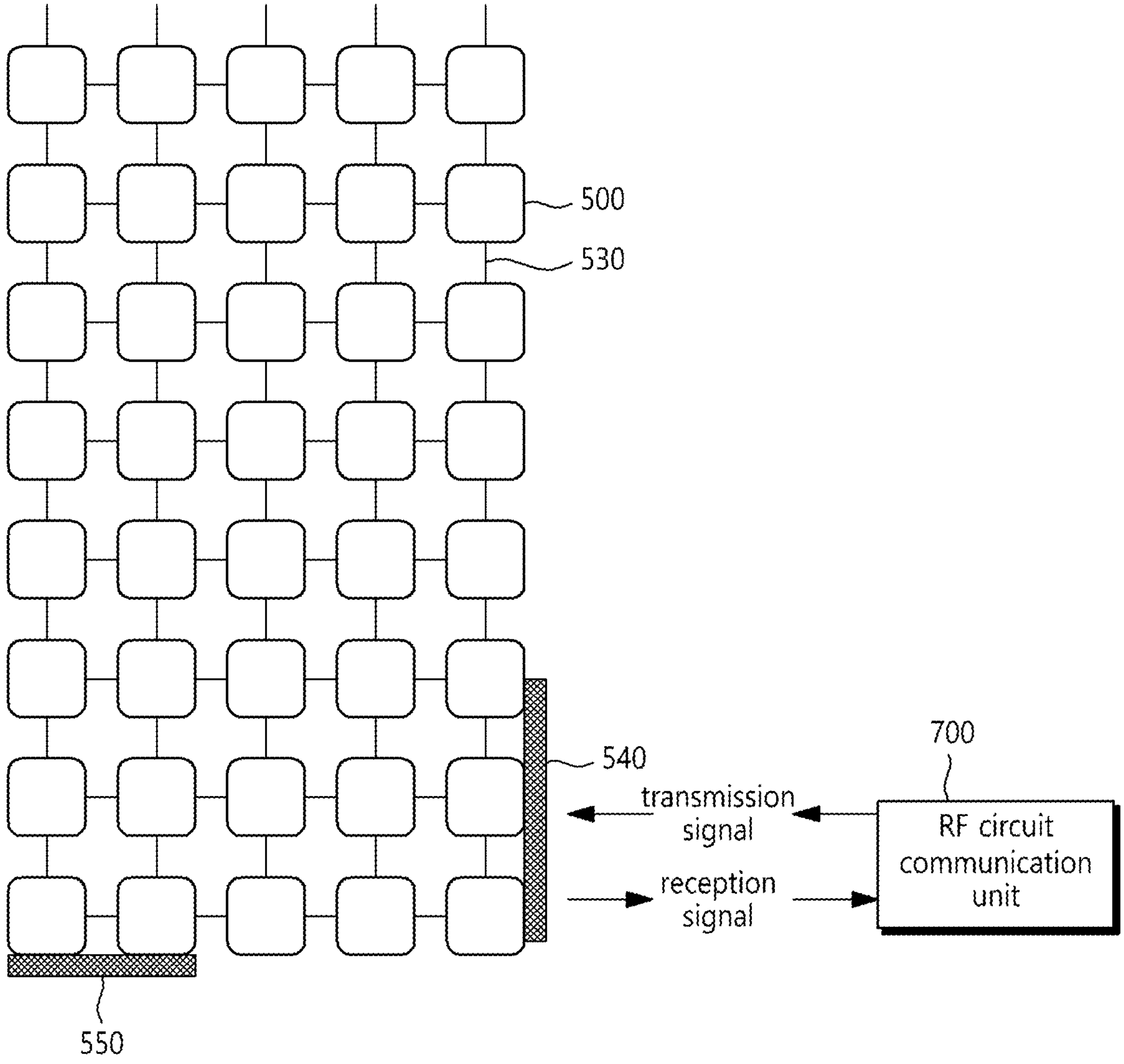
Figure 8A:
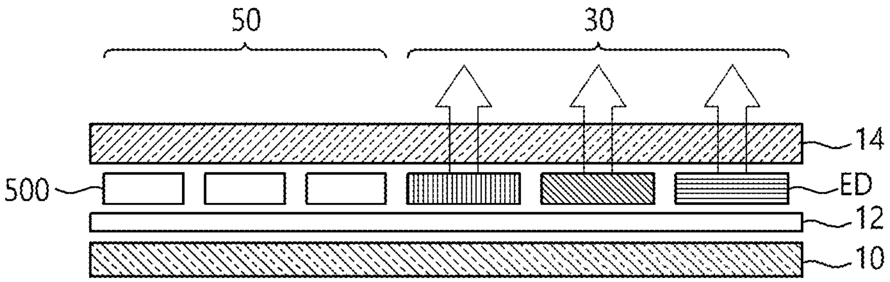
Figure 8B:
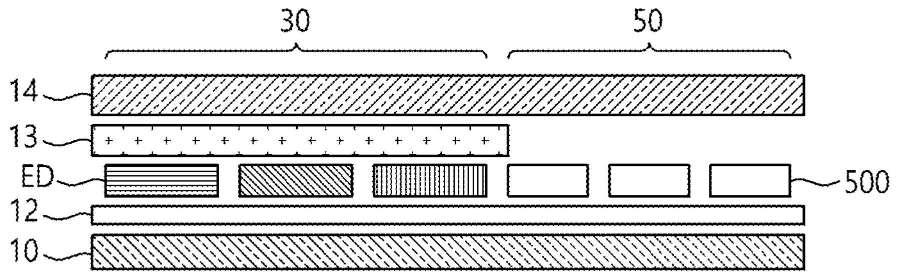
Figure 8C:
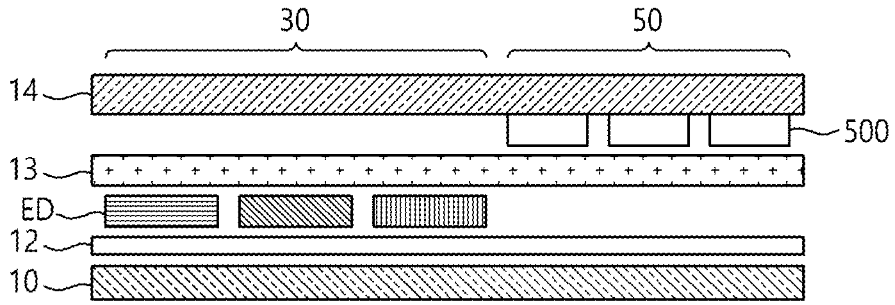

FIG. 3 schematically illustrates an antenna device and a display device including an antenna unit according to an embodiment of the disclosure;

FIGS. 4A, 4B, and 4C illustrate an example of a connection structure of a switching element and a radiator constituting an antenna device according to an embodiment of the disclosure;

FIG. 5 is a view illustrating an example of a relationship between antenna size and resonance frequency according to an embodiment of the disclosure;

FIGS. 6A, 6B, 6C, 6D, 6E, and 6F illustrate an example of an antenna shape reconfigurable based on a resonance frequency of an antenna according to an embodiment of the disclosure;

FIG. 7 is a concept view illustrating antenna driving according to an embodiment of the disclosure; and FIGS. 8A, 8B, and 8C are cross-sectional views illustrating examples of a display device including an antenna unit according to embodiments of the disclosure.

DETAILED DESCRIPTION

In the following description of examples or embodiments of the disclosure, reference will be made to the accompanying drawings in which specific examples or embodiments that can be implemented are shown by way of illustration, and in which the same reference numerals and signs can be used to designate the same or like components even when they are shown in different accompanying drawings from one another. The present disclosure may, however, be embodied in different forms and should not be construed as limited to the example embodiments set forth herein. Rather, these example embodiments are provided so that this disclosure will be thorough and complete and will fully convey the scope of the present disclosure to those skilled in the art.

In the following description, where a detailed description of a relevant known function or configuration may unnecessarily obscure aspects of the present disclosure, a detailed description of such a known function or configuration may be omitted or be briefly discussed.

Where a term like "include," "have," "contain," "constitute," "make up of," or "formed of" is used, one or more other elements may be added unless the term is used with a more limiting term, such as "only." An element described in a singular form may include a plurality of elements, and vice versa, unless the context clearly indicates otherwise.

Although terms "first," "second," "A," "B," "(A)," "(B)," and the like may be used herein to describe various elements, these elements should not be interpreted to be limited by these terms as they are not used to define a particular essence, order, sequence, precedence, or number of such elements. These terms are used only to refer to one element separately from another. For example, a first element could be termed a second element, and a second element could similarly be termed a first element, without departing from the scope of the present disclosure.

Where a description is provided that a first element "is connected or coupled to," "contacts or overlaps," a second element, or the like, it should be interpreted that, not only can the first element "be directly connected or coupled to" or "directly contact or overlap" the second element, but a third element can also be "interposed" between the first and second elements, or the first and second elements can "be connected or coupled to" or "contact or overlap" each other via a fourth element. Here, the second element may be included in at least one of two or more elements that "are connected or coupled to" or "contact or overlap" each other.

Where time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the terms are used with a more limiting term like "directly" or "immediately."

In addition, where any dimensions, relative sizes, and the like, are described, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

Hereinafter, various embodiments of the present disclosure are described in detail with reference to the accompanying drawings.

Figure 1:
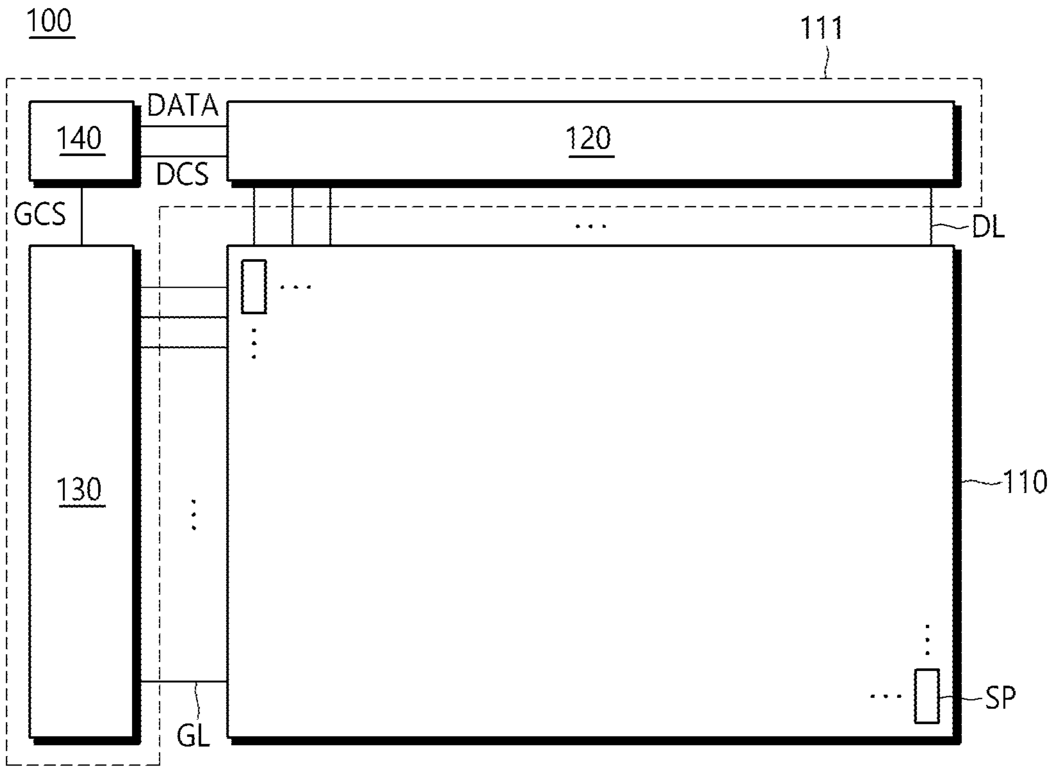
FIG. 1 is a view schematically illustrating a system configuration of an organic light emitting display device according to embodiments of the disclosure.

FIG. 1 is a view schematically illustrating a system configuration of an organic light emitting display device 100 according to embodiments of the disclosure.

As shown in FIG. 1, an organic light emitting display device 100 according to the present embodiments may include a display panel 110 where a plurality of data lines DL and a plurality of gate lines GL are arranged, and a plurality of subpixels SP defined by the plurality of data lines DL and the plurality of gate lines GL are arranged in a matrix type and a driving circuit 111 for driving the display panel 110.

From a functional point of view, the driving circuit 111 may include a data driving circuit 120 driving the plurality of data lines DL, a gate driving circuit 130 driving the plurality of gate lines GL, and a controller 140 controlling the data driving circuit 120 and the gate driving circuit 130.

In the display panel 110, the plurality of data lines DL and the plurality of gate lines GL may be disposed to cross each other. For example, the plurality of gate lines GL may be arranged in rows or columns, and the plurality of data lines DL may be arranged in columns or rows. For ease of description, it is assumed below that the plurality of gate lines GL are arranged in rows, and the plurality of data lines DL are arranged in columns.

In the display panel 110, other types of lines, in addition to the plurality of data lines DL and the plurality of gate lines GL, may be disposed.

The controller 140 may supply image data DATA to the data driving circuit 120.

Further, the controller 140 may control the operation of the data driving circuit 120 and the gate driving circuit 130 by supplying various control signals DCS and GCS necessary for the driving operation of the data driving circuit 120 and the gate driving circuit 130.

The controller 140 starts scanning according to a timing implemented in each frame, converts input image data input from the outside into image data DATA suited for the data signal format used in the data driving circuit 120, outputs the image data DATA, and controls data driving at an appropriate time suited for scanning.

To control the data driving circuit 120 and gate driving circuit 130, the controller 140 receives timing signals, such as a vertical sync signal Vsync, horizontal sync signal Hsync, input data enable signal (Data Enable, DE), or clock signal CLK form the outside (e.g., a host system), generate various control signals, and outputs the control signals to the data driving circuit 120 and gate driving circuit 130.

As an example, to control the gate driving circuit 130, the controller 140 outputs various gate control signals GCS including a gate start pulse GSP, a gate shift clock GSC, and a gate output enable signal (Gate Output Enable, GOE).

To control the data driving circuit 120, the controller 140 outputs various data control signals DCS including, e.g., a source start pulse SSP, a source sampling clock SSC, and a source output enable signal (Source Output Enable, SOE).

The controller 140 may be a timing controller used in typical display technology, or a control device that may perform other control functions in addition to the functions of the timing controller.

The controller 140 may be implemented as a separate component from the data driving circuit 120, or the controller 140, along with the data driving circuit 120, may be implemented as an integrated circuit.

In particular, the controller 140 according to an embodiment may include an antenna controller 600.

The antenna controller 600 may reconfigure an antenna by controlling turn-on/turn-off of a plurality of switching elements 530 connected between a plurality of radiators 500 provided in at least a portion of the display panel 110. In other words, the antenna controller 600 may determine the number and position of turned-on switching elements among the plurality of switching elements 530 to determine the shape of the antenna, vary the resonance frequency of the antenna, and vary the radiation property of the antenna. This is described below in further detail with reference to FIGS. 3 to 8C.

The data driving circuit 120 receives the image data DATA from the controller 140 and supply data voltage to the plurality of data lines DL, thereby driving the plurality of data lines DL. Here, data driving circuit 120 is also referred to as a 'source driving circuit.'

The data driving circuit 120 may include a shift register, a latch circuit, a digital-to-analog converter (DAC), and an output buffer.

In some cases, the data driving circuit 120 may further include one or more analog-digital converters ADC.

The gate driving circuit 130 sequentially drives the plurality of gate lines GL by sequentially supplying scan signals to the plurality of gate lines GL. Here, gate driving circuit 130 is also referred to as a 'scan driving circuit.'

The gate driving circuit 130 may include, e.g., a shift register and a level shifter.

The gate driving circuit 130 sequentially supplies scan signals of On voltage or Off voltage to the plurality of gate lines GL under the control of the controller 140.

When a specific gate line is opened by the gate driving circuit 130, the data driving circuit 120 converts the image data DATA received from the controller 140 into an analog data voltage and supplies the analog data voltage to the plurality of data lines DL.

The data driving circuit 120 may be positioned on only one side (e.g., the top or bottom side) of the display panel 110 and, in some cases, the data driving circuit 120 may be positioned on each of two opposite sides (e.g., both the top and bottom sides) of the display panel 110 depending on, e.g., driving schemes or panel designs.

The gate driving circuit 130 may be positioned on only one side (e.g., the left or right side) of the display panel 110 and, in some cases, the gate driving circuit 130 may be positioned on each of two opposite sides (e.g., both the left and right sides) of the display panel 110 depending on, e.g., driving schemes or panel designs.

The data driving circuit 120 may include at least one source driver integrated circuit SDIC.

Each source driver integrated circuit SDIC may be connected, in a tape automated bonding (TAB) type or chip-on-glass (COG) type, to the bonding pad of the display panel 110 or may be disposed directly on the display panel 110. In some cases, each source driver integrated circuit (SDIC) may be integrated and disposed on the display panel 110. Each source driver integrated circuit SDIC may be implemented in a chip-on-film (COF) type. In this case, each source driver integrated circuit (SDIC) may be mounted on a circuit film and be electrically connected with the data lines DL of the display panel 110 through the circuit film.

In the gate driving circuit 130, one or more gate driver integrated circuits (ICs) GDIC may be connected to the bonding pad of the display panel 110 in a TAB or COG type. Further, the gate driving circuit 130 may be implemented in a gate-in-panel (GIP) type and be directly disposed on the display panel 110. Further, the gate driving circuit 130 may be implemented in a chip-on-film (COF) type. In this case, each gate driver integrated circuit GDIC included in the gate driving circuit 130 may be mounted on a circuit film and be electrically connected with the gate lines GL of the display panel 110 through the circuit film.

Figure 2:
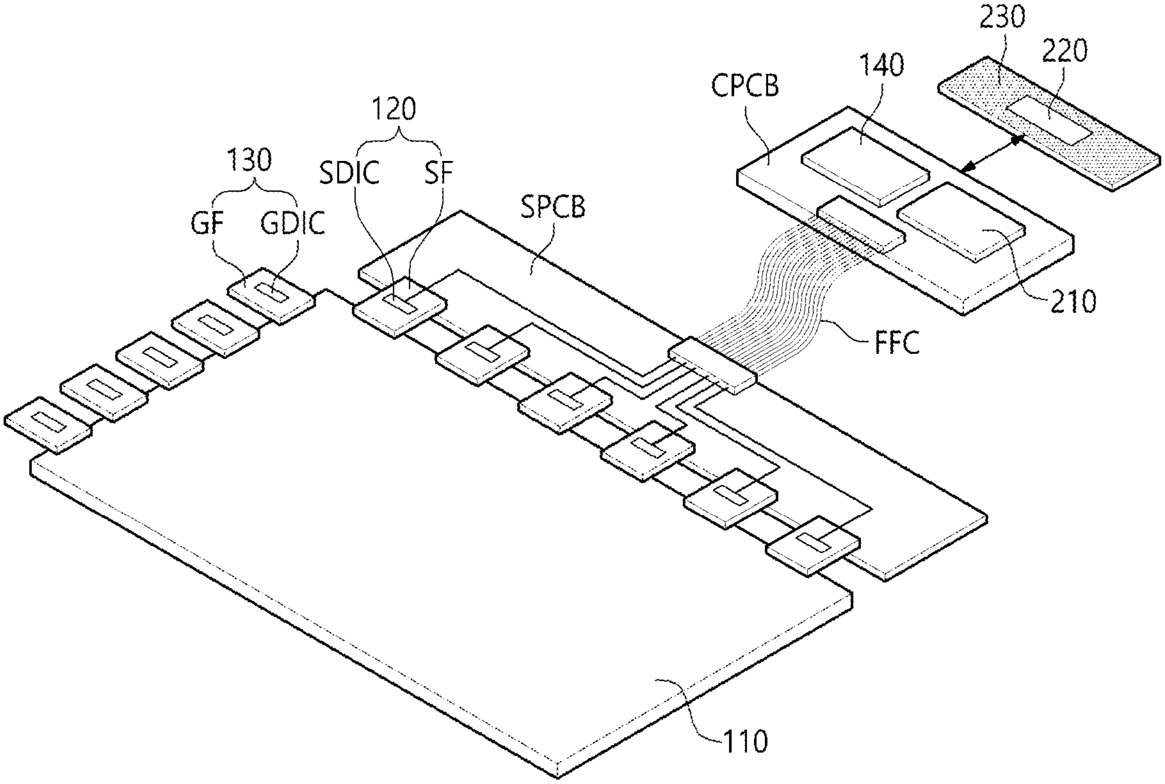
FIG. 2 is a view illustrating an example of system implementation of an organic light emitting display device according to embodiments of the disclosure.

FIG. 2 is a view illustrating an example of system implementation of an organic light emitting display device according to embodiments of the disclosure.

FIG. 2 illustrates an example in which each source driver integrated circuit SDIC included in the data driving circuit 120 is implemented in a chip-on-film (COF) type among various types (e.g., TAB, COG, and COF), and the gate driving circuit 130 is implemented in a gate-in-panel (GIP) type among various types (e.g., TAB, COG, COF, and GIP).

Each of the plurality of source driver integrated circuits SDIC included in the data driving circuit 120 may be mounted on the source-side circuit film SF.

One side of the source-side circuit film SF may be electrically connected with the display panel 110.

Lines for electrically connecting the source driver integrated circuit SDIC and the display panel 110 may be disposed on the source-side circuit film SF.

The organic light emitting display device 100 may include at least one source printed circuit board SPCB for circuit connection between a plurality of source driver integrated circuits SDIC and other devices and a control printed circuit board CPCB for mounting control components and various electric devices.

The other side of the source-side circuit film SF on which the source driving integrated circuit SDIC is mounted may be connected to the at least one source printed circuit board SPCB.

In other words, one side of the source-side circuit film SF where the source driver integrated circuit SDIC is mounted may be electrically connected with the display panel 110, and the other side thereof may be electrically connected with the source printed circuit board SPCB.

A controller 140 for controlling the operation of, e.g., the data driving circuit 120 and the gate driving circuit 130 and a power management integrated circuit (PMIC) 210 for supplying various voltages or currents to, e.g., the display panel 110, the data driving circuit 120, and the gate driving circuit 130 or controlling various voltages or currents to be supplied may be mounted on the control printed circuit board CPCB.

At least one source printed circuit board SPCB and the control printed circuit board CPCB may be circuit-connected through at least one connection member. Here, the connection member may be, e.g., a flexible printed circuit (FPC) or a flexible flat cable (FFC).

At least one source printed circuit board SPCB and control printed circuit board CPCB may be integrated into one printed circuit board.

The organic light emitting display device 100 may further include a set board 230 electrically connected with the control printed circuit board CPCB. The set board 230 may also be referred to as a power board.

A main power management circuit (M-PMC) 220 for managing the overall power of the organic light emitting display device 100 may be disposed on the set board 230.

The power management integrated circuit 210 is a circuit that manages power for a display module including the display panel 110 and its driving circuits 120, 130, and 140, and the main power management circuit 220 is a circuit that manages the power of the whole including the display module, and may interwork with the power management integrated circuit 210.

Each of the subpixels SP arranged on the display panel 110 included in the organic light emitting display device 100 according to the present embodiments may include an organic light emitting diode (OLED) which is a self-emissive element and a circuit element, e.g., a driving transistor, for driving the organic light emitting diode (OLED).

The type and number of circuit elements constituting each subpixel SP may be varied depending on functions to be provided and design schemes.

Meanwhile, the display device 100 also requires an antenna for receiving a wireless signal from the outside or transmitting a wireless signal from the display device.

The display device may be provided with a transparent antenna which is optically transparent or may transmit visible light to some extent. The transparent antenna may be integrated into the display device without a great sense of visual heterogeneity. The transparent antenna includes an indium tin oxide film (ITO film), an AgHT series multilayer thin film, and a metal mesh antenna. Among them, the ITO film tends to be most suitable for making the antenna of the display panel when considering light transmittance, conductivity, and processing techniques. When designing the antenna, the ITO film has a fixed resonance frequency to operate at a specific communication frequency. Therefore, when there are various places to use the panel, there is a disadvantage in that it is necessary to design several versions of antennas according to each need.

In other words, since the antenna needs to have a different shape of the radiator to fit the radio signals of various frequency bands, it is necessary to adaptively implement the antenna provided in the display device 100 according to various frequency bands.

Embodiments of the disclosure, which disclose such a method, are described in more detail with reference to FIGS. 3 to 8C.

FIG. 3 schematically illustrates an antenna device and a display device including an antenna unit according to an embodiment of the disclosure. FIGS. 4A, 4B, and 4C illustrate an example of a connection structure of a switching element and a radiator constituting an antenna device according to an embodiment of the disclosure.

As shown in FIG. 3, a display device 100 including an antenna device according to an embodiment of the disclosure may include a substrate 10, a pixel unit 30, and an antenna unit 50.

The substrate 10 includes a display area DA in which an image is displayed and a non-display area NDA in which an image is not displayed.

The pixel unit 30 may include a plurality of pixels disposed in the display area DA. The pixels may include a red subpixel, a green subpixel, and a blue subpixel, and each of the red subpixel, the green subpixel, and the blue subpixel may include a light emitting diode (LED) as a light emitting element ED.

The antenna unit 50 may be disposed in at least a portion of the display area DA or at least a portion of the non-display area NDA. A partial enlarged view of FIG. 3 illustrates an example in which the antenna unit 50 is formed at a portion of an edge corresponding to the non-display area DA in contact with the outermost portion of the pixel unit 30, but this is merely an example, and the antenna unit 50 may be formed over at least a portion of the display area DA and at least a portion of the non-display area NDA, or may be formed only in at least a portion of the display area DA.

As shown in FIGS. 3 and 4A to 4C, the antenna unit 50 may include a plurality of radiators R1 to RN 500, and an antenna constituent circuit 530, 540, and 550 constituting an antenna using at least one of the plurality of radiators 500.

As shown in FIGS. 3 and 4A to 4C, the antenna constituent circuit may be electrically connected to the radiator 500 to allow the radiator 500 to function as an antenna, and may include a switching element 530, a feeding part 540, and a shorting pin 550.

As shown in FIGS. 3 and 4A to 4C, the plurality of switching elements (530 of FIG. 3 and SW1 to SW14 of FIGS. 4A to 4C) may control whether to connect the plurality of radiators 500.

In this case, the size of each of the radiators 500 may correspond to the size of the unit pixel. In other words, each radiator may be provided on a per-pixel basis.

Further, each of the radiators 500 may be electrically connected to or disconnected from a radiator adjacent to the front surface through the switching element 530.

For example, each of the radiators 500 may be connected to the radiators 500 adjacent to each other in the vertical direction on each of the four sides through the switching element 530, and when the switching element 530 is turned on, two radiators connected to two opposite sides of the switching element 530 may be electrically connected to each other, and when the switching element 530 is turned off, two radiators connected to two opposite sides of the switching element 530 may be electrically cut off from each other.

The switching element 530 may be provided as a thin film transistor. Such a thin film transistor may be formed in the process of forming the transistor configured in the subpixel of the display area DA, through the same process and with the same component as the transistor.

FIG. 4A illustrates a state in which only a first radiator R1 to which the feeding part 540 is connected and a second radiator R2 to which the shorting pin 550 is connected are connected by the first switch SW1.

As shown in FIG. 4A, according to the on-off state of each of the plurality of switching elements SW1 to SW12, N (where N is a natural number of 1 or more) radiators among the plurality of radiators R1 to R6 may be electrically connected to constitute an antenna. In FIGS. 4A to 4C, for convenience of description, a case in which there are 9 radiators and 14 switching elements is exemplified, but the number of radiators and the number of switching elements are not limited thereto.

As illustrated in FIGS. 4A to 4C, the size of the antenna may vary according to the number of switching elements turned on among the plurality of switching elements 530.

After the connection state of FIG. 4A, as illustrated in FIG. 4B, as the first switch SW1, the second switch SW2, the fourth switch SW4, the seventh switch SW7, and the eighth switch SW8 are turned on by the antenna controller 600, the first radiator R1, the second radiator R2, the third radiator R3, the fourth radiator R4, and the fifth radiator R5 may be connected to the feeding part 540.

Further, the first radiator R1, the second radiator R2, the third radiator R3, the fourth radiator R4, and the fifth radiator R5 may be connected to the shorting pin 550.

Accordingly, the first radiator R1, the second radiator R2, the third radiator R3, the fourth radiator R4, and the fifth radiator R5 may receive an electrical signal from the feeding part 540 and may be grounded through the shorting pin 550 to function as an antenna.

Alternatively, after the connection state of FIG. 4A, as illustrated in FIG. 4C, as the first switch SW1, the fourth switch SW4, the seventh switch SW7, the eighth switch SW8, the tenth switch SW10, the eleventh switch SW11, and the thirteenth switch SW13 are turned on by the antenna controller 600, the first radiator R1, the second radiator R2, the fourth radiator R4, the fifth radiator R5, the seventh radiator R7, and the eighth radiator R8 may be connected to the feeding part 540.

Further, the first radiator R1, the second radiator R2, the fourth radiator R4, the fifth radiator R5, the seventh radiator R7, and the eighth radiator R8 may be connected to the shorting pin 550.

Accordingly, the first radiator R1, the second radiator R2, the fourth radiator R4, the fifth radiator R5, the seventh radiator R7, and the eighth radiator R8 may receive an electrical signal from the feeding part 540 and may be grounded through the shorting pin 550 to function as an antenna.

According to the position of the turned-on switching element 530 among the plurality of switching elements 530, the positions of radiators constituting the antenna may be determined, and thus the shape of the antenna may vary.

Further, the number and position of the radiators 500 constituting the antenna ANT may be determined according to the number and position of the turned-on switching elements 530 among the plurality of switching elements 530, and thus the resonance frequency of the antenna unit may be varied.

Each of the plurality of radiators 500 may correspond to one pixel size. In other words, the unit radiator may have an area corresponding to the unit pixel.

FIG. 5 is a view illustrating an example of a relationship between antenna size and resonance frequency according to an embodiment of the disclosure. FIGS. 6A, 6B, 6C, 6D, 6E, and 6F illustrate an example of an antenna shape reconfigurable based on a resonance frequency of an antenna according to an embodiment of the disclosure.

As shown in FIG. 5, a relationship between the operating frequency and the length value of the planar inverted-F antenna (PIFA) is given as an equation below. For reference, the PIFA may serve as a radiating element while the patch is resonated with the ground surface by current feeding, and the bandwidth, the gain, the resonance frequency, or the like may be determined according to the height, the area, and the length of the patch, the position of the feeding line, and the position of the shorting pin.

$$L1 + L2 - W = \frac{\lambda}{4}$$

$$c = \lambda f$$

-continued $$f = \frac{c_0}{\lambda\sqrt{\varepsilon_r}} = \frac{3 \cdot 10^8}{\lambda\sqrt{\varepsilon_r}}$$

Here, L1 is the vertical length of the antenna, L2 is the horizontal length of the antenna, W is the width of the shorting pin, λ is the wavelength, c is the speed of light, f is the frequency, $\varepsilon_r$ is the dielectric constant, and $c_0$ is the speed of light in a vacuum.

Accordingly, the antenna may be implemented by determining the final length or width of the antenna by combining unit radiators according to the resonance frequency of the antenna to be serviced.

As shown in FIG. 5, assuming a rectangle having the same cross-sectional area as the total cross-sectional area obtained by summing the cross-sectional areas of the unit radiators constituting the antenna ANT, the sum of the vertical length L1 and the horizontal length L2 of the rectangle is inversely proportional to the resonance frequency of the antenna.

Further, the shorting pin 550 (i.e., the ground) connected to the antenna ANT has a predetermined width W, and a value obtained by subtracting the width W of the shorting pin 550 from the sum of the vertical length L1 and the horizontal length L2 is inversely proportional to the resonance frequency of the antenna.

Figure 6A:
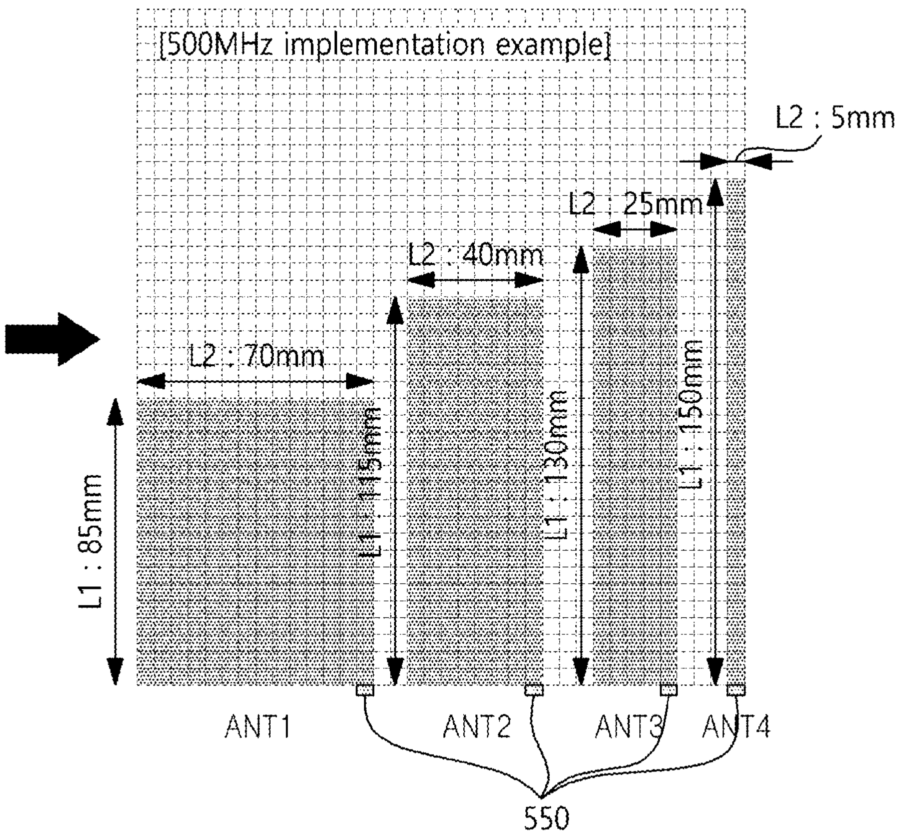

As shown in FIG. 6A, when implementing the resonance frequency of the antenna ANT as 500 MHz, a rectangular antenna ANT having the same cross-sectional area as the total cross-sectional area obtained by summing the cross-sectional areas of the unit radiators 500 provided in the unit pixel size may be assumed.

In other words, the layouts of ANT1, ANT2, ANT3, and ANT4 are all different, but the total areas are the same.

In this case, the shape of the rectangle may be reconfigured into several shapes as illustrated in FIG. 6A within a range in which the value obtained by subtracting the width W of the shorting pin 550 from the sum of the vertical length L1 and horizontal length L2 of the rectangular antenna ANT remains the same. This is based on the principle that the shape of the antenna ANT may be determined as the antenna controller 600 determines the number and position of the turned-on switching elements among the plurality of switching elements 530 as described above.

Figure 6B:
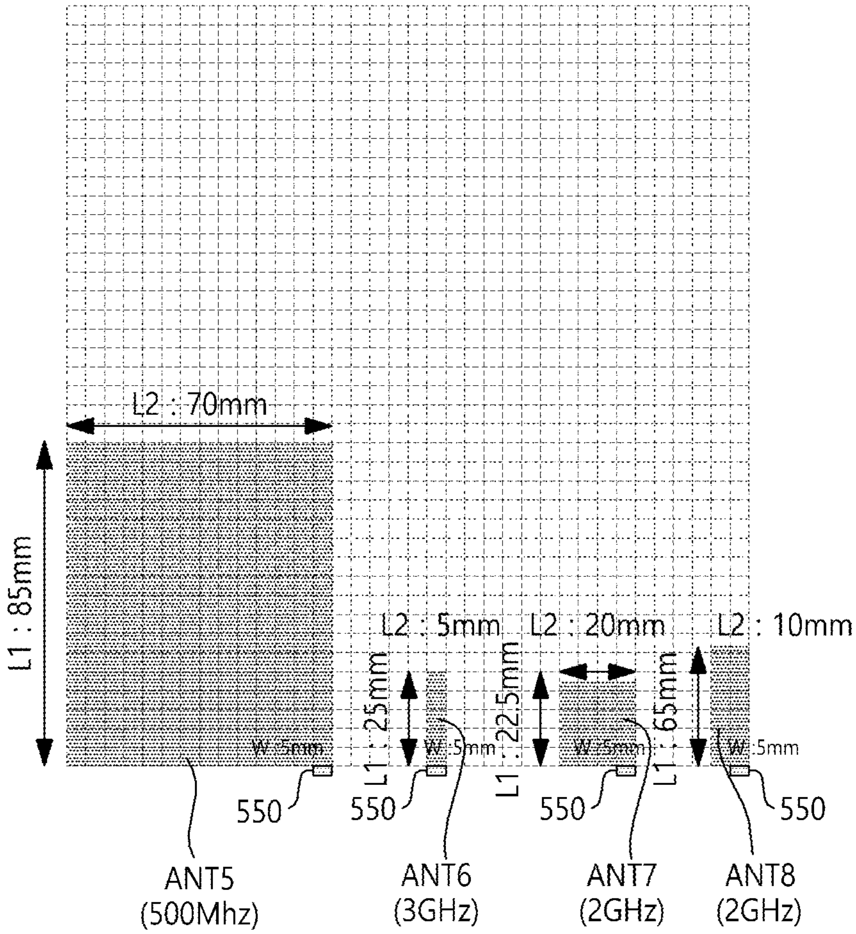

As shown in FIG. 6B, it may be identified that the value obtained by subtracting the width W of the shorting pin 550 from the sum of the vertical length L1 and the horizontal length L2 is inversely proportional to the resonance frequency of the antenna. In other words, it may be identified that ANT7 and ANT8 having a resonance frequency of 2 GHz and ANT6 having a resonance frequency of 3 GHz have relatively smaller cross-sectional area sizes of the antenna ANT than ANT5 having a resonance frequency of 500 MHz.

Figure 6C:
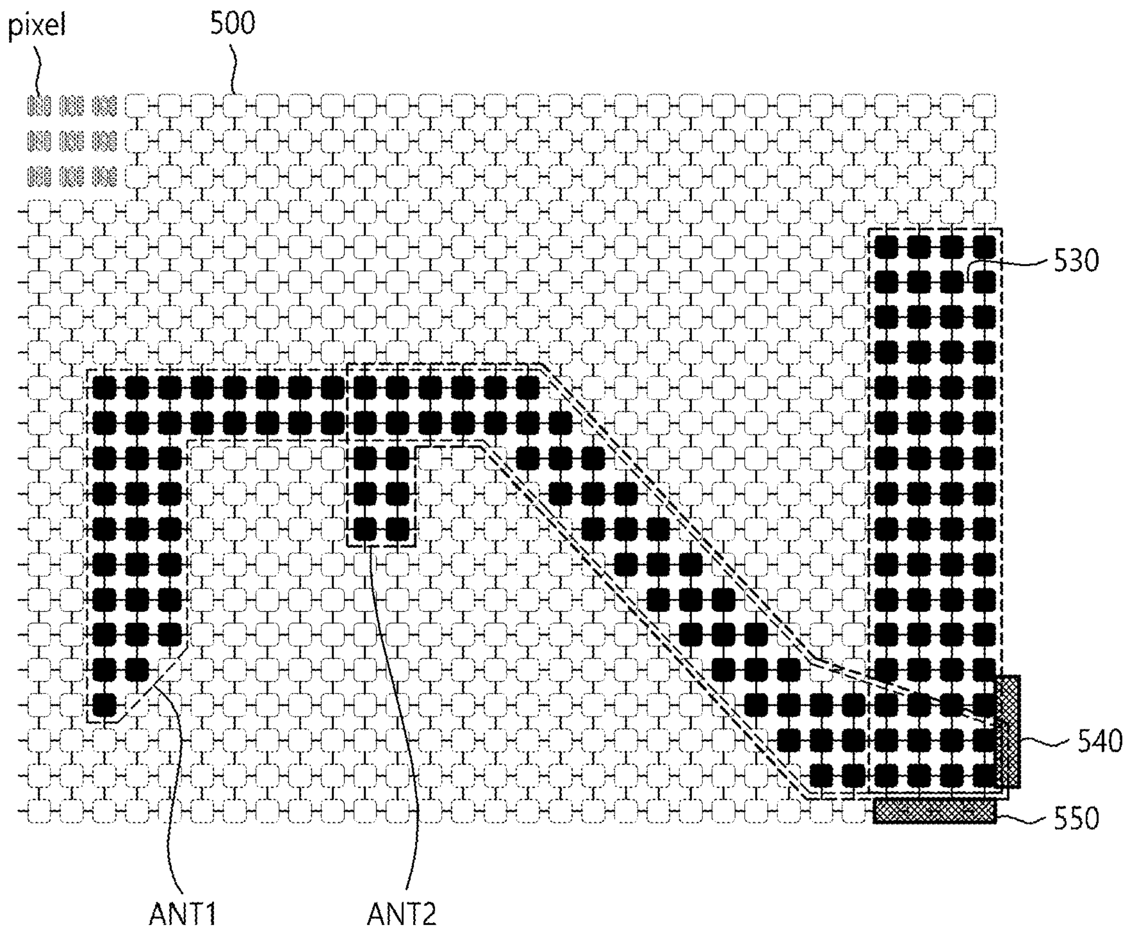
Figure 6D:
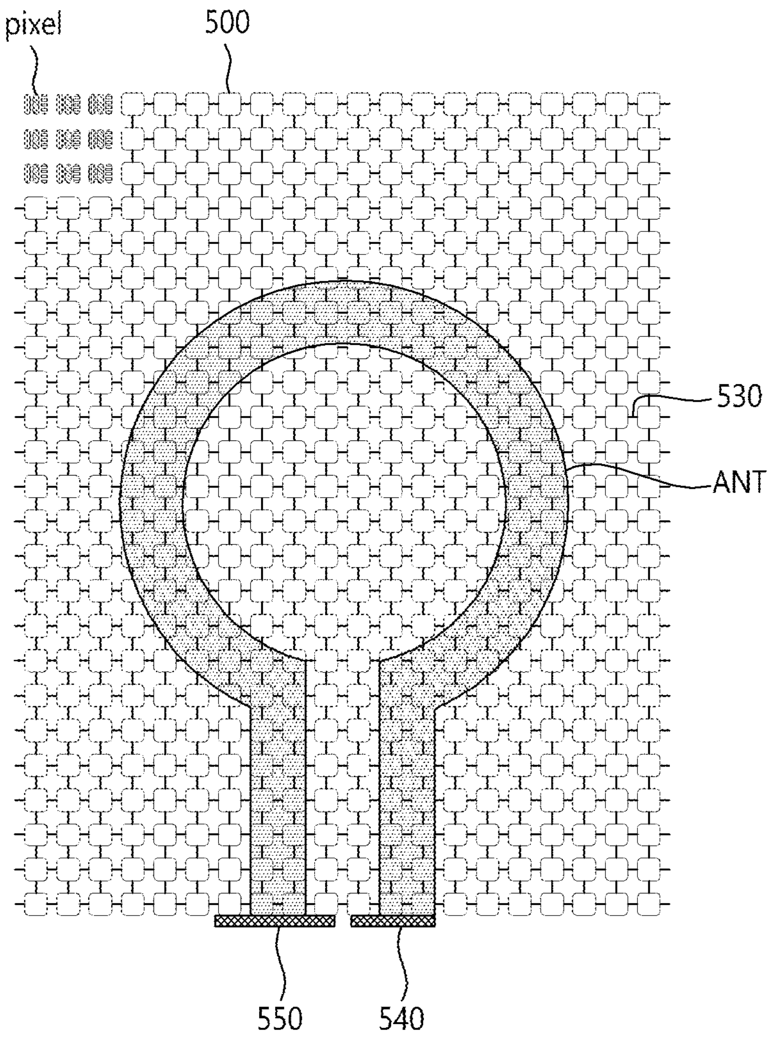
Figure 6E:
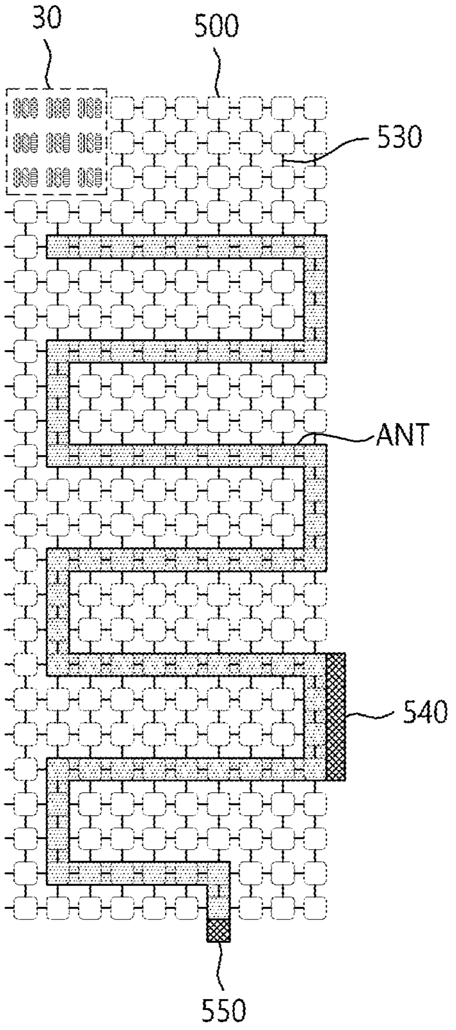
Figure 6F:
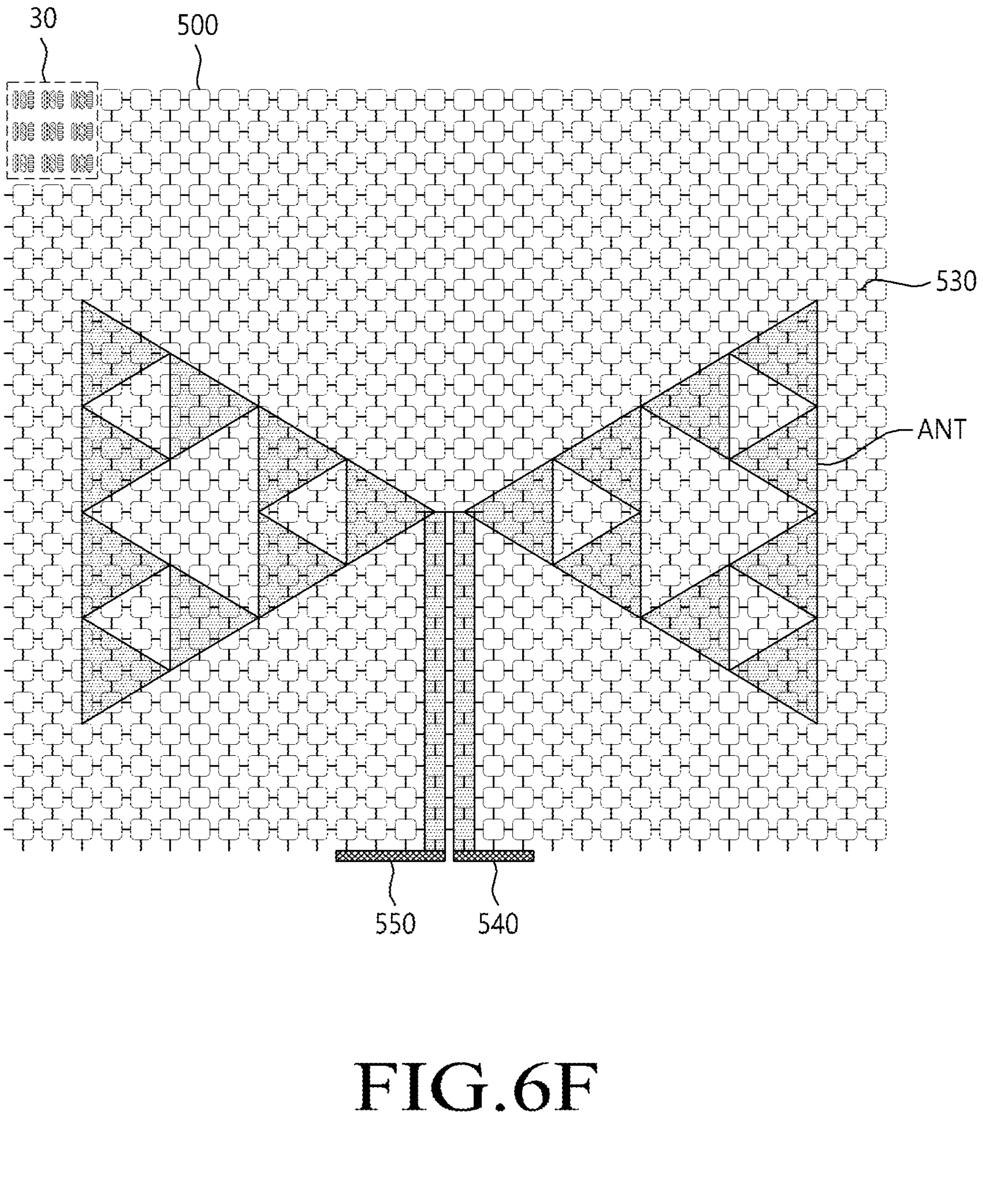

As shown in FIG. 6C, the antenna controller 600 may connect additional radiators according to the resonance frequency to be implemented from predetermined radiators contacting the shorting pin 550 and a predetermined radiator contacting the feeding part 540 so that at least a portion of the antenna ANT is connected to the feeding part 540, and at least another portion thereof is connected to the shorting pin 550.

In this case, the antenna controller 600 may control the number and position of the turned-on switching elements SW 530 among the plurality of switching elements 530 according to the resonance frequency to further connect the radiators, thereby reconfiguring the antennas ANT resonating at different frequencies as illustrated in FIG. 6C.

For example, as shown in FIG. 6C, the antenna controller 600 may control the number and position of the turned-on switching elements among the plurality of switching elements 530 provided in the display panel 110 according to the resonance frequency to change the antenna ANT1 resonating at a first frequency implemented in the display device 100 into an antenna ANT resonating at another frequency, thereby reconfiguring the antenna as an antenna ANT2 resonating at a second frequency or an antenna ANT3 resonating at a third frequency. Alternatively, the antenna controller 600 may implement the loop-shaped antenna of FIG. 6D, the meander line-shaped antenna of FIG. 6E, and the fractal antenna of FIG. 6F by controlling the number and position of the turned-on switching elements among the plurality of switching elements 530 provided in the display panel 110 according to the resonance frequency and/or the use of the antenna.

For reference, the fractal antenna is an antenna using a fractal, self-similar design to maximize the effective length or increase the circumference (internal section or external structure) of a material capable of receiving or transmitting electromagnetic radiation within a given total surface area or volume.

Further, the feeding part 540 and the shorting pin 550 may be repositioned according to the properties and the purpose of implementation of the antenna. In other words, the position of the radiator to be connected to the feeding part 540 and the position of the radiator to be connected to the shorting pin 550 may be determined according to the properties and the implementation purpose of the antenna. Here, the radiator to be connected to each of the feeding part 540 and the shorting pin 550 may be a unit radiator or a plurality of radiators.

Further, as a plurality of feeding parts 540 and a plurality of shorting pins 550 are provided for a plurality of unit radiators, a plurality of antennas may be provided thereby. In this case, the plurality of antennas may support multiple bands.

As an embodiment, the multiple bands may be implemented through a plurality of unit radiators using a switch. To that end, a desired band may be supported by determining connection or non-connection between unit radiators by controlling turn-on/turn-off of the plurality of switches according to the required band of the antenna.

According to an embodiment, a first antenna corresponding to a first band may be implemented according to a connection structure between unit radiators by a plurality of switches, and a second antenna corresponding to a second band different from the first band may be implemented. Here, when the first band is implemented, the second band may be turned off through the switch to minimize an influence of coupling between bands.

Here, a predetermined unit radiator may be selectively connected to an antenna supporting different bands through a switch. In other words, the unit radiator implementing the first antenna may be a unit radiator implementing the second antenna according to switch control.

As shown in FIG. 7, the feeding part 540 may be connected to at least some radiators disposed at the outermost portion of the plurality of radiators 500. The feeding part 540 may supply a signal to at least some radiators 500. In an embodiment, the feeding part 540 may receive an external signal received from an external RF circuit communication unit 700 and transfer the external signal to the radiator 500.

Similarly, as shown in FIG. 7, the antenna constituent circuit may include a feeding part 540 connected to at least some radiators R1 among the plurality of radiators 500. In this case, the feeding part 540 may receive a signal from at least some radiators 500. In an embodiment, the feeding part 540 may transfer the signal received from at least some radiators 500 to the external RF circuit communication unit 700.

FIGS. 8A to 8C are cross-sectional views illustrating an example of a display device including an antenna unit according to an embodiment of the disclosure.

As shown in FIGS. 8A to 8C, each of the plurality of pixels 30 includes a red subpixel R, a green subpixel G, and a blue subpixel B, and each of the red subpixel R, the green subpixel G, and the blue subpixel B includes a light emitting diode (LED).

A plurality of radiators 500 may be positioned on a side surface of the outermost light emitting diode among the plurality of light emitting diodes.

The display device 100 may further include an encapsulation layer 13 disposed on the plurality of light emitting diodes, and the plurality of radiators 500 may be disposed on the encapsulation layer 13.

In the vertical cross-sectional views of FIGS. 8A to 8C, the plurality of radiators 500 may be disposed on the plurality of light emitting diodes 12 and may be provided to overlap the plurality of light emitting diodes 12. To that end, the plurality of radiators 500 may be formed of a transparent metal.

For example, the transparent metal may be a transparent metal material such as indium tin oxide (ITO), indium zinc oxide (IZO), and zinc oxide (ZnO).

Embodiments of the disclosure described above are briefly described below.

A display device according to an embodiment of the disclosure may comprise a substrate including a display area where an image is displayed and a non-display area where the image is not displayed, a pixel unit including a plurality of pixels disposed in the display area DA, and an antenna unit disposed in at least a portion of the display area DA or at least a portion of the non-display area NDA. The antenna unit may include a plurality of radiators, and an antenna constituent circuit configuring an antenna with at least one of the plurality of radiators.

The antenna constituent circuit may include a plurality of switching elements controlling whether to connect the plurality of radiators. Each of the plurality of switching elements may include a thin film transistor.

A size of the antenna may vary according to a number of turned-on switching elements among the plurality of switching elements.

A shape of the antenna may vary according to a position of a turned-on switching element among the plurality of switching elements.

A resonance frequency of the antenna unit may vary according to a number and position of turned-on switching elements among the plurality of switching elements.

A radiation property of the antenna unit may vary according to a number and position of turned-on switching elements among the plurality of switching elements.

The antenna constituent circuit may include a feeding part connected to at least some radiators disposed at an outermost portion of the plurality of radiators. The feeding part may supply a signal to the at least some radiators.

The antenna constituent circuit may include a feeding part connected to at least some radiators disposed at an outermost portion of the plurality of radiators. The feeding part may receive a signal from the at least some radiators.

According to an on/off state of each of the plurality of switching elements, N (where N is a natural number of 1 or more) radiators among the plurality of radiators may be electrically connected to form the antenna.

Each of the plurality of radiators may correspond to a size of one pixel.

A sum of a vertical length L1 and a horizontal length L2 of a rectangular antenna may be inversely proportional to a resonance frequency of the antenna, when the rectangular antenna is assumed to have the same cross-sectional area as a total cross-sectional area obtained by summing cross-sectional areas of unit radiators constituting the antenna.

A ground connected to the antenna may have a predetermined width W. A value obtained by subtracting the width W from the sum of the vertical length L1 and the horizontal length L2 may be inversely proportional to the resonance frequency of the antenna.

Each of the plurality of pixels may include a red subpixel, a green subpixel, and a blue subpixel. Each of the red subpixel, the green subpixel, and the blue subpixel may include a light emitting diode (LED).

The plurality of radiators may be positioned on a side surface of an outermost light emitting diode among the plurality of light emitting diodes.

The display device may further comprise an encapsulation layer disposed on the plurality of light emitting diodes. The plurality of radiators may be disposed on the encapsulation layer.

The plurality of radiators may be disposed on the plurality of light emitting diodes and overlap the plurality of light emitting diodes.

The plurality of radiators may be formed of a transparent metal.

The antenna constituent circuit may include a feeding part connected to a first radiator among the plurality of radiators, and a shorting pin connected to a second radiator among the plurality of radiators.

The display device may further comprise a radio frequency (RF) circuit unit electrically connected to the feeding part.

An antenna device according to an embodiment of the disclosure may comprise a substrate, a plurality of radiators disposed on the substrate, and an antenna constituent circuit configuring an antenna with at least one of the plurality of radiators. The antenna constituent circuit may control whether to connect the plurality of radiators, and include a plurality of switching elements disposed on the substrate. One of the plurality of switching elements may be connected between two adjacent radiators among the plurality of radiators.

Embodiments of the disclosure described above are briefly described below.

The above description has been presented to enable any person skilled in the art to make and use the technical ideas of the disclosure, and has been provided in the context of example embodiments and applications. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide examples of the technical ideas of the disclosure for illustrative purposes only. That is, the disclosed embodiments are intended to illustrate the technical ideas of the disclosure by way of example. Thus, the scope of the present disclosure is not limited to the embodiments discussed herein.

What is claimed:

1. A display device, comprising:

a substrate including a display area configured to display an image and a non-display area not configured to display an image;

a pixel unit including a plurality of pixels disposed in the display area; and an antenna unit disposed in at least a portion of the display area or at least a portion of the non-display area, the antenna unit including:

a plurality of radiators; and an antenna constituent circuit configuring an antenna with at least one of the plurality of radiators, wherein each of the plurality of radiators is substantially identical in size to a pixel of the plurality of pixels so as to be provided on a per-pixel basis.

2. The display device of claim 1, wherein:

the antenna constituent circuit includes a plurality of switching elements controlling whether to connect the plurality of radiators; and each of the plurality of switching elements includes a thin film transistor.

3. The display device of claim 2, wherein a size of the antenna varies according to a number of turned-on switching elements among the plurality of switching elements.

4. The display device of claim 2, wherein a shape of the antenna varies according to a position of a turned-on switching element among the plurality of switching elements.

5. The display device of claim 2, wherein a resonance frequency of the antenna unit varies according to a number and a position of turned-on switching elements among the plurality of switching elements.

6. The display device of claim 2, wherein a radiation property of the antenna unit varies according to a number and a position of turned-on switching elements among the plurality of switching elements.

7. The display device of claim 1, wherein:

the antenna constituent circuit includes a feeding part connected to at least some radiators disposed at an outermost portion of the plurality of radiators; and the feeding part is configured to supply a signal to the at least some radiators.

8. The display device of claim 1, wherein:

the antenna constituent circuit includes a feeding part connected to at least some radiators disposed at an outermost portion of the plurality of radiators; and the feeding part is configured to receive a signal from the at least some radiators.

9. The display device of claim 2, wherein:

according to an on/off state of each of the plurality of switching elements, N radiators among the plurality of radiators are electrically connected to form the antenna; and N is a natural number of 1 or more.

10. The display device of claim 1, wherein a sum of a vertical length and a horizontal length of a rectangular antenna is inversely proportional to a resonance frequency of the antenna, if the rectangular antenna has a same cross-sectional area as a total cross-sectional area obtained by summing cross-sectional areas of unit radiators constituting the rectangular antenna.

11. The display device of claim 10, wherein:

a ground connected to the antenna has a predetermined width; and a value obtained by subtracting the width from the sum of the vertical length and the horizontal length is inversely proportional to the resonance frequency of the antenna.

12. The display device of claim 1, wherein:

each of the plurality of pixels includes a red subpixel, a green subpixel, and a blue subpixel; and each of the red subpixel, the green subpixel, and the blue subpixel includes a light emitting diode.

13. The display device of claim 12, wherein the plurality of radiators are positioned on a side surface of an outermost light emitting diode among the plurality of light emitting diodes.

14. The display device of claim 12, further comprising an encapsulation layer disposed on the plurality of light emitting diodes, wherein the plurality of radiators are disposed on the encapsulation layer.

15. The display device of claim 12, wherein the plurality of radiators are disposed on the plurality of light emitting diodes and overlap the plurality of light emitting diodes.

16. The display device of claim 15, wherein the plurality of radiators are formed of a transparent metal.

17. The display device of claim 1, wherein the antenna constituent circuit includes:

a feeding part connected to a first radiator among the plurality of radiators; and a shorting pin connected to a second radiator among the plurality of radiators.

18. The display device of claim 17, further comprising a radio frequency (RF) circuit electrically connected to the feeding part.

19. An antenna device, comprising:

a substrate;

a plurality of radiators disposed on the substrate; and an antenna constituent circuit configuring an antenna with at least one of the plurality of radiators, wherein the antenna constituent circuit is configured to control whether to connect the plurality of radiators, and includes a plurality of switching elements disposed on the substrate, and wherein one of the plurality of switching elements is connected between two adjacent radiators among the plurality of radiators, and wherein each of the plurality of radiators is substantially identical in size to a pixel of a display device so as to be provided on a per-pixel basis.

* * * * *